United States Patent
Lee et al.

(10) Patent No.: US 11,477,534 B2
(45) Date of Patent: Oct. 18, 2022

(54) DISPLAY DEVICE

(71) Applicant: LG ELECTRONICS INC., Seoul (KR)

(72) Inventors: Hyeseung Lee, Seoul (KR); Seongwoon Seol, Seoul (KR); Obong An, Seoul (KR); Eunyoung Cho, Seoul (KR); Yujin Bae, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/413,833

(22) PCT Filed: Jul. 16, 2019

(86) PCT No.: PCT/KR2019/008790
§ 371 (c)(1),
(2) Date: Jun. 14, 2021

(87) PCT Pub. No.: WO2021/010518
PCT Pub. Date: Jan. 21, 2021

(65) Prior Publication Data
US 2022/0053242 A1 Feb. 17, 2022

(51) Int. Cl.
*H04N 21/478* (2011.01)
*G06V 20/40* (2022.01)
(Continued)

(52) U.S. Cl.
CPC ....... *H04N 21/47815* (2013.01); *G06V 20/41* (2022.01); *H04N 21/4383* (2013.01); *H04N 21/44008* (2013.01); *H04N 21/4821* (2013.01)

(58) Field of Classification Search
CPC ......... H04N 21/47815; H04N 21/4383; H04N 21/44008; H04N 21/4821; H04N 21/4312;
(Continued)

(56) References Cited

U.S. PATENT DOCUMENTS

| 6,347,400 B1 * | 2/2002 | Ohkura | H04N 21/4882 |
| | | | 725/39 |
| 2002/0057380 A1 * | 5/2002 | Matey | H04N 21/482 |
| | | | 348/E5.122 |

(Continued)

FOREIGN PATENT DOCUMENTS

| KR | 10-1053751 B1 | 8/2011 |
| KR | 10-2016-0009415 A | 1/2016 |

(Continued)

*Primary Examiner* — Nnenna N Ekpo
(74) *Attorney, Agent, or Firm* — Birch, Stewart, Kolasch & Birch, LLP

(57) ABSTRACT

A display device including a display configured to display content; and a controller configured to capture an image of the displayed content, transmit data of the captured image to an external server, receive content information and a playback time point of the content corresponding to the captured image from the external server, acquire a presence or absence of shopping information related to the displayed content based on the received content information and the playback time point of the content, and display the shopping information on the display according to the acquired presence of the shopping information.

19 Claims, 15 Drawing Sheets

(51) Int. Cl.
*H04N 21/438* (2011.01)
*H04N 21/44* (2011.01)
*H04N 21/482* (2011.01)

(58) Field of Classification Search
CPC ............. H04N 21/4314; H04N 21/478; G06V 20/41
See application file for complete search history.

(56) References Cited

U.S. PATENT DOCUMENTS

| | | | |
|---|---|---|---|
| 2013/0205333 A1 | 8/2013 | Han et al. | |
| 2014/0105570 A1* | 4/2014 | Chang | H04N 5/76 386/241 |
| 2015/0170245 A1* | 6/2015 | Scoglio | G06Q 30/0623 705/14.55 |
| 2019/0019522 A1* | 1/2019 | Gabarron | G10L 25/54 |
| 2019/0179851 A1* | 6/2019 | Neumeier | H04N 21/4532 |

FOREIGN PATENT DOCUMENTS

| | | |
|---|---|---|
| KR | 10-2016-0085076 A | 7/2016 |
| KR | 10-2018-0037826 A | 4/2018 |

\* cited by examiner

FIG. 8
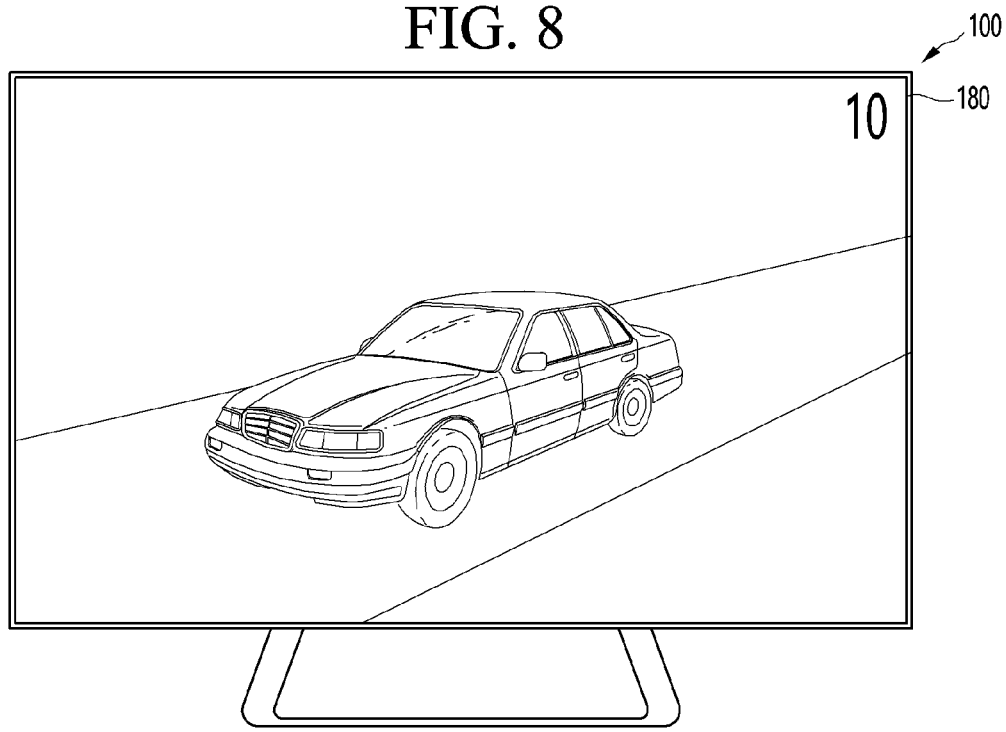
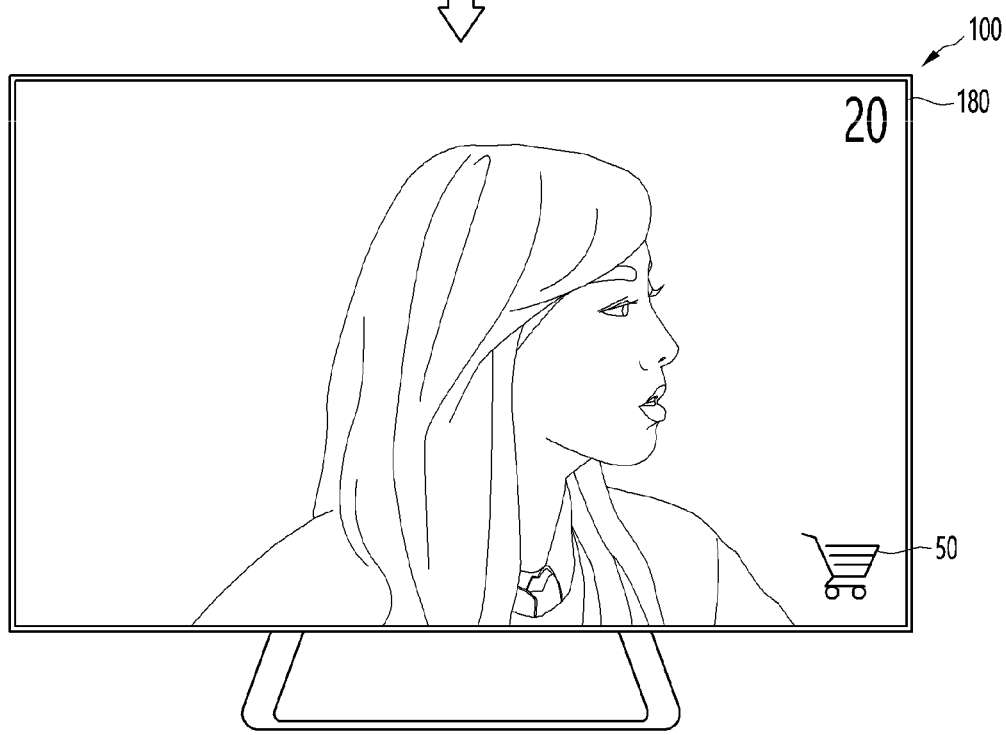

FIG. 9
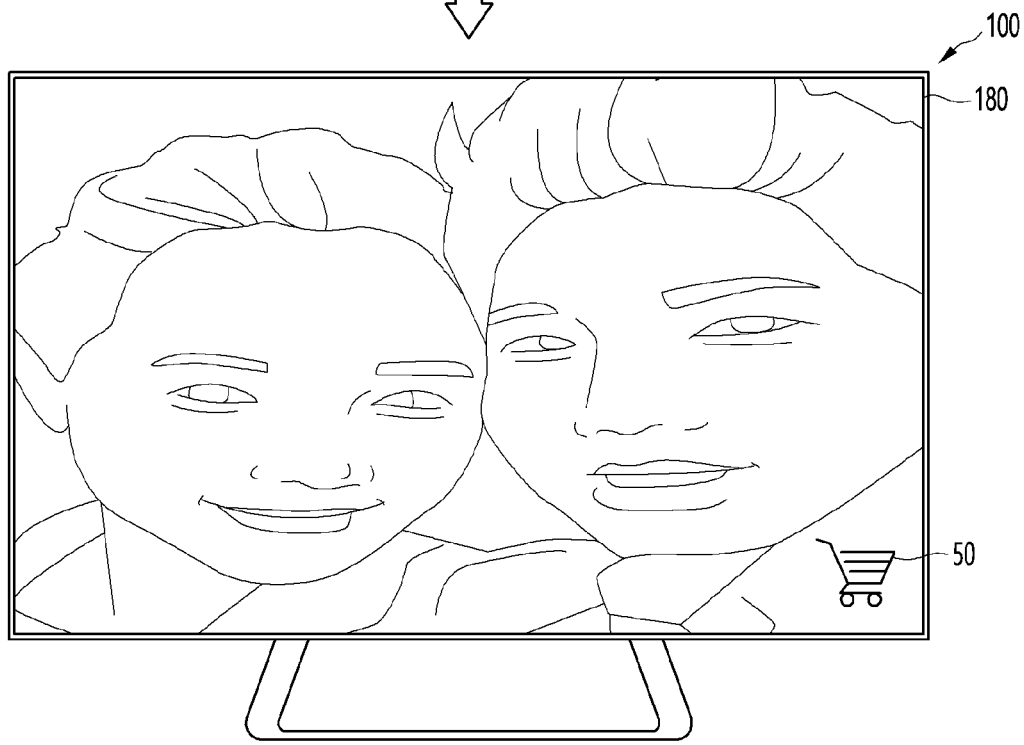

DISPLAY DEVICE

CROSS-REFERENCE TO RELATED APPLICATION

This Application is the National Phase of PCT International Application No. PCT/KR2019/008790 filed on Jul. 16, 2019, which is hereby expressly incorporated by reference into the present application.

BACKGROUND OF THE INVENTION

Field of the Invention

The present disclosure relates to a display device, and more particularly, to a display device that provides shopping information related to content.

Discussion of the Related Art

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

Meanwhile, a user may want to purchase a product that appears in the content when viewing the content. In this case, the user must directly search for the product appearing in the content using the Internet or the like, but it may be difficult to find a product that matches the product in the content.

Accordingly, there may be a need for a method of providing shopping information on products appearing in a current scene by recognizing content currently being viewed by the user and a playback time point. In addition, since there are content of which shopping information is provided and content of which shopping information is not provided, there is a need for a method of suggesting content of which shopping information is provided to the user.

SUMMARY OF THE INVENTION

An object of the present disclosure is to provide a display device capable of outputting shopping information suitable for a current scene.

An object of the present disclosure is to provide a display device capable of informing a user of whether or not content being viewed includes shopping information.

An object of the present disclosure is to provide a display device capable of suggesting content including shopping information to a user.

According to an embodiment, a display device may include a display configured to display content and a controller configured to transmit data of a capture image of the content to an external server, acquire content information and a playback time point corresponding to the capture image through the external server, and display shopping information according to the content information and the playback time point.

The controller may transmit the data to a first server, and then acquire the content information corresponding to the capture image from the first server, and transmit the capture image and the content information to a second server and then acquire the playback time point corresponding to the capture image from the second server.

The first server may be a server having data for ACR (automatic content recognition), and the second server may be a server having database for a hash value of the capture image.

The controller may acquire at least one of the content information and the playback time point from EPG (electronic program guide) using a time point when the capture image is captured.

The controller may control the display to further display a shopping icon for displaying shopping information related to the content.

The controller may acquire a presence or absence of the shopping information related to the content, and control the display to display the shopping icon when there is the shopping information related to the content.

The controller may re-acquire a capture image of the content and re-acquire shopping information using data for the re-acquired capture image after a set time has elapsed when there is no shopping information related to the content.

The controller may control the display to display the shopping icon on a banner when the banner is displayed.

The controller may control the display to further display the capture image on the banner.

The controller may control the display to display the shopping icon when a channel switch command is received.

The controller may acquire the content information and a playback time point when a set time has elapsed after a channel has been switched according to the channel switch command.

The controller may control the display to display the shopping icon when there is the shopping information related to the content as a result of the acquisition of the content information and the playback time point.

The controller may detect whether the content is changed and control the display to display the shopping icon when the content is changed.

The controller may control the display to display the shopping icon when EPG is output.

The controller may control the display to display the shopping icon with respect to a program of which shopping information is present among programs included in the EPG.

Advantageous Effects

According to the embodiments of the present disclosure, since the current scene is captured to acquire content information and a playback time point, the current scene can be more accurately recognized, and accordingly, shopping information on products appearing in the current scene can be provided.

According to the embodiments of the present disclosure, since content is recognized using ACR (Automatic Content Recognition) or EPG (Electronic Program Guide) and the playback time point is detected using a hash value of an image, thus recognizing the current scene more quickly and accurately.

According to the embodiments of the present disclosure, it is possible to inform the user of the presence or absence of shopping information related to content being viewed by the user and the presence or absence of shopping information related to a program scheduled to be broadcast, thereby improving accessibility to shopping information.

BRIEF DESCRIPTION OF THE DRAWINGS

FIG. 8 is a diagram showing a method of displaying a shopping icon when a channel switch command is received in a display device according to an embodiment of the present disclosure.

FIG. 9 is an exemplary diagram of a method of displaying a shopping icon when a content change is detected in a display device according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
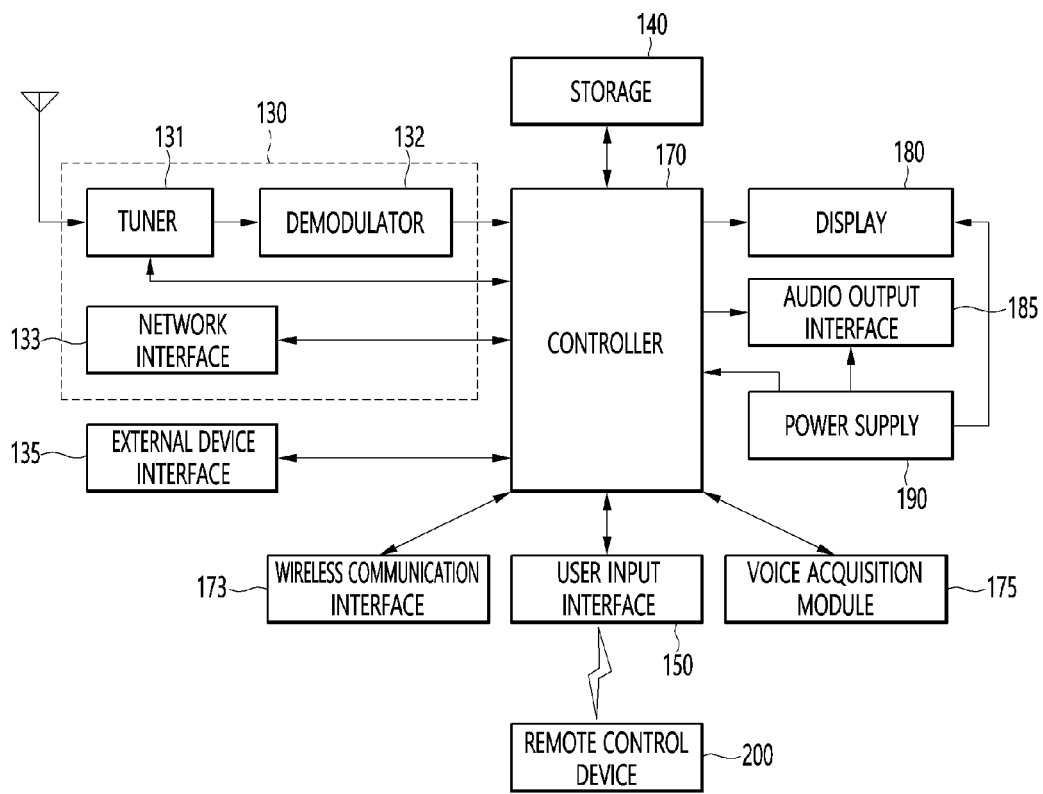
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
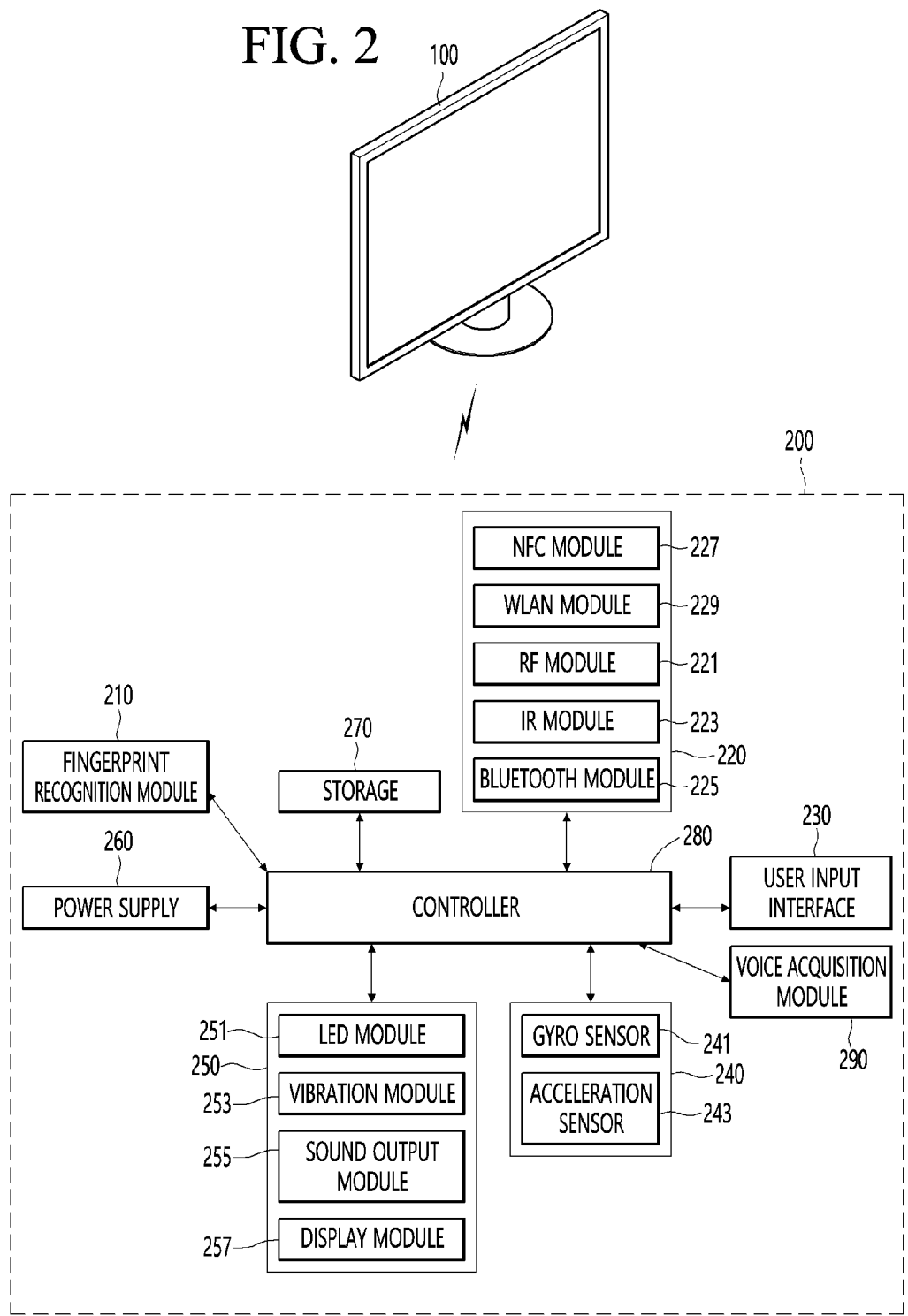
FIG. 2 is a block diagram of a remote control device according to an embodiment of the present disclosure.
Figure 3:
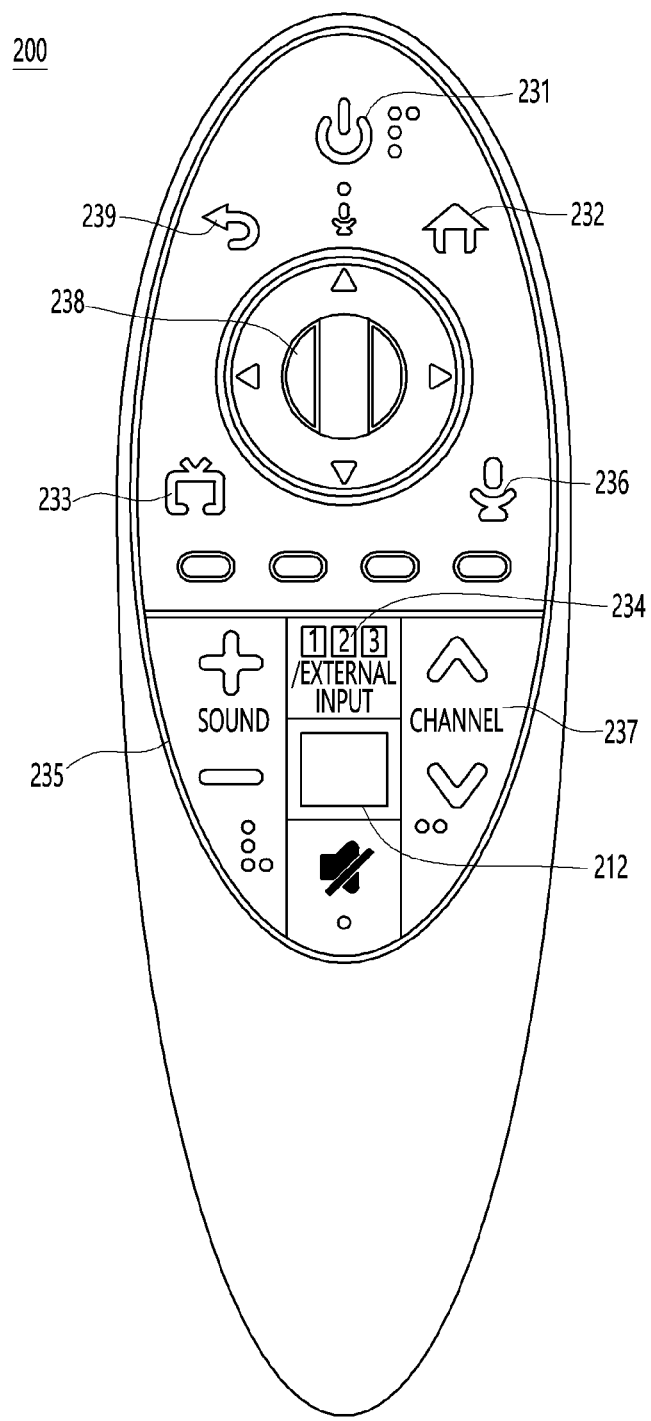
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
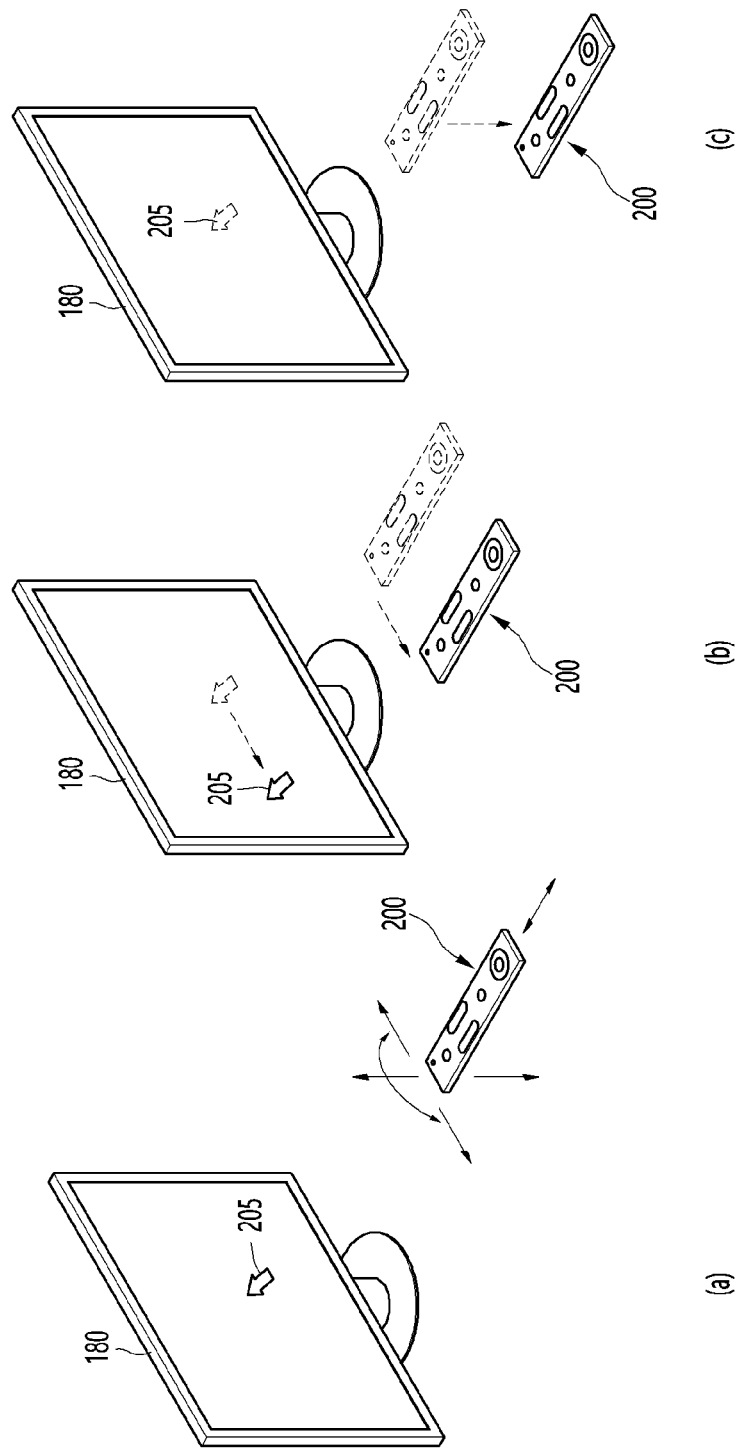
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
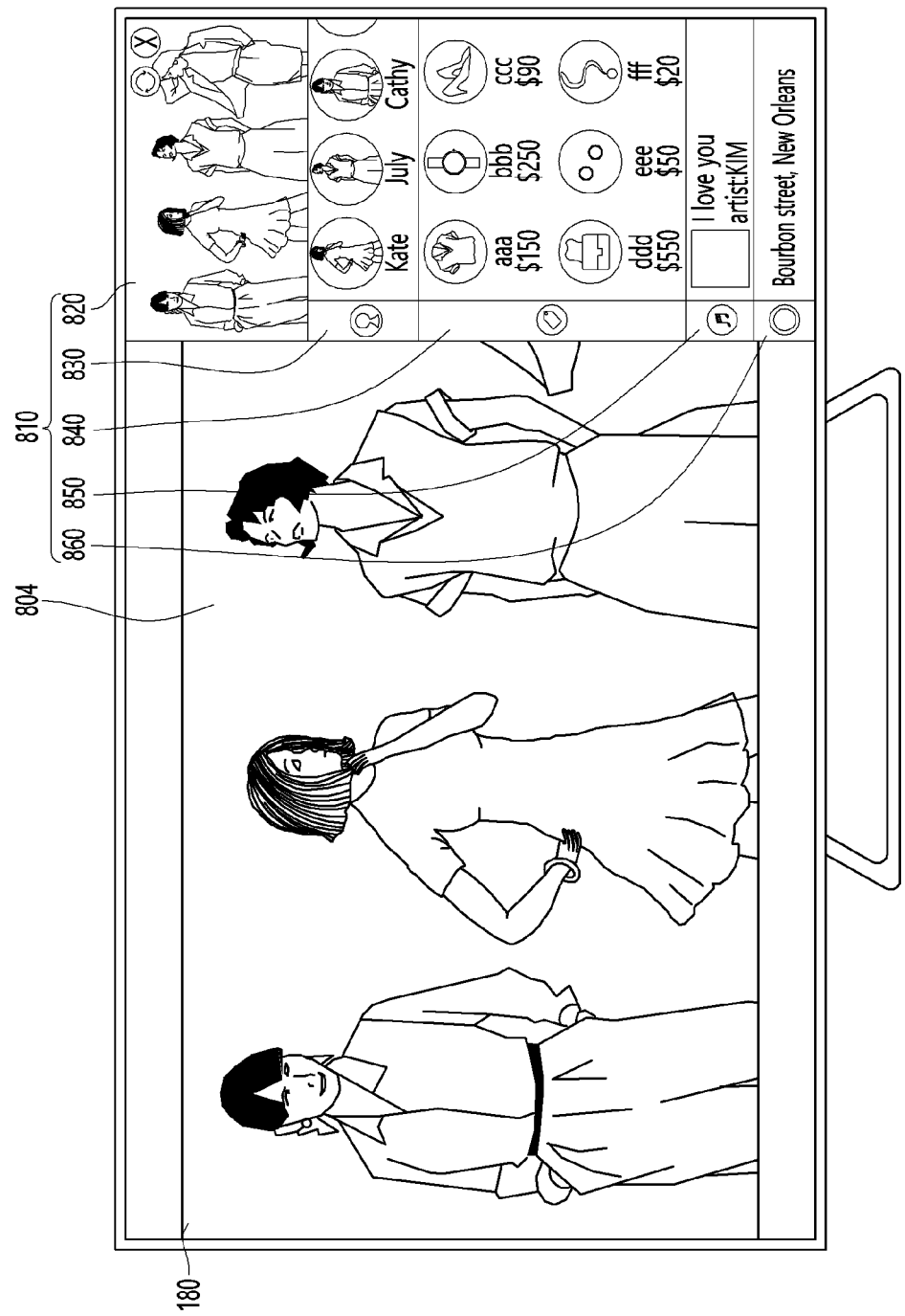
FIG. 5 is an exemplary diagram of a method for displaying shopping information of content by a display device according to an embodiment of the present disclosure.

FIG. 5 is an exemplary diagram of a method for displaying shopping information of content by a display device according to an embodiment of the present disclosure.

The display device 100 according to an embodiment of the present disclosure may display shopping information of content through the display 180. Referring to the example of FIG. 5, the display 180 may display content 804 and shopping information 810. The shopping information 810 may be displayed while overlapping the content 804.

The shopping information 810 may refer to information about products or the like appearing in the content 804. For example, the shopping information 810 may include information on an image of a product appearing in the content 804, a product name, a product price, and the like.

The shopping information 810 may include information for a user to purchase the product appearing in the content 804.

In addition, the shopping information 810 may be provided by dividing products appearing in the content 804 by characters of the content 804.

In addition, the shopping information 810 may further include music information 850 and place information 860 for each music and place appearing in the content 804, as well as the products appearing in the content 804. That is, the shopping information 810 may include various types of information related to the content 804.

Referring to FIG. 5, the shopping information 810 may include at least one of a capture image 820, person information 830, product information 840, music information 850, and place information 860.

The capture image 820 is an image capturing a scene of the content 804 and may be an image obtained by capturing a scene in which a person, product, music, or place included in the shopping information 810 appears.

The person information 830 may include a person appearing in the capture image 820.

The product information 840 may include products appearing in the capture image 820. The product information 840 may be displayed for each of characters included in the person information 830.

Referring to the example of FIG. 5, when 'kate' of the person information 830 is selected, a product related to 'Kate' may be displayed on the product information 840, when 'July' of the person information 830 is selected, a product related to 'July' may be displayed on the product information 840 and when 'Cathy' of the person information 830 is selected, a product related to 'Cathy' may be displayed on the product information 840.

The product information 840 may include information on a product appearing in the content, and the product may include products of various categories such as clothing, accessories, furniture, vehicles, electronic devices, exercise equipment, and musical instruments.

The music information 850 may include information related to music when a scene corresponding to the capture image 820 is play-backed.

The place information 860 may include information on a place in the scene corresponding to the capture image 820.

Meanwhile, FIG. 5 is merely an example for convenience of description, and the controller 170 may display the shopping information 810 in various ways.

According to an embodiment, the controller 170 may receive a search command for current content while displaying the content 804, and when receiving the search command, the controller 170 may control the display 180 to display the shopping information 810 as shown in FIG. 5.

According to another embodiment, the controller 170 may display a shopping icon 50 (see FIGS. 8 to 10) on the content 804, and when receiving a command for selecting the shopping icon 50, control the display 180 to display the shopping information 810.

To this end, the controller 170 may determine whether the content 804 is a content capable of providing the shopping information 810, and only when the content 804 is capable of providing the shopping information 810, control the display 180 such that the shopping icon 50 is displayed on the content 804.

Alternatively, the controller 170 may extract only the content capable of providing the shopping information 810 and provide a list of shoppable content, or display whether the shopping information 810 can be provided for each program item using the shopping icon 510 when an EPG (Electronic Program Guide) is output.

That is, the display device 100 according to an embodiment of the present disclosure may inform a user of whether or not the shopping information 810 of the content 804 can be provided in various ways.

Figure 6:
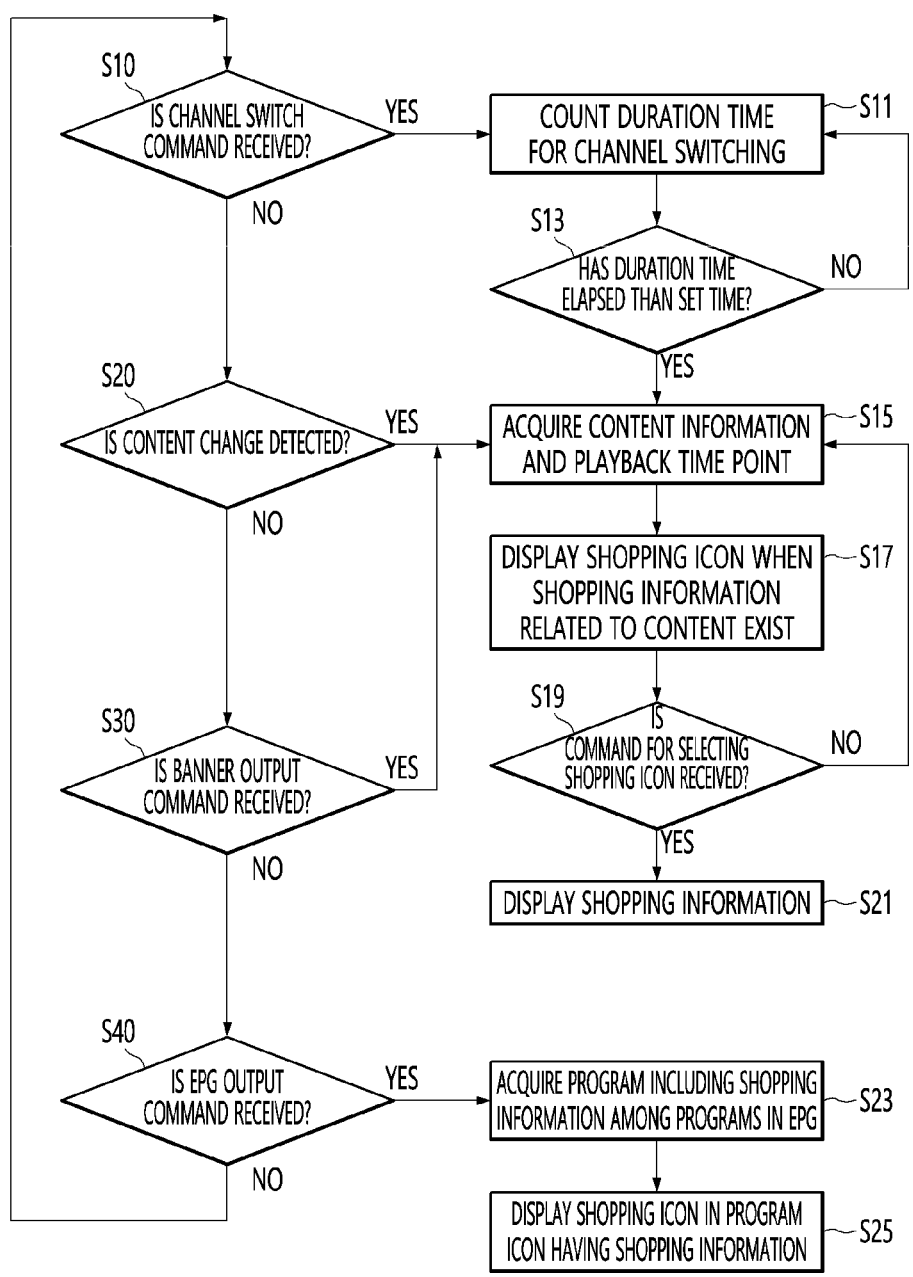
FIG. 6 is a flowchart for a method for operating a display apparatus according to a first embodiment of the present disclosure.

FIG. 6 is a flowchart for a method for operating a display apparatus according to a first embodiment of the present disclosure.

First, the display 180 may display content, and the controller 170 may detect an output time point for a notification on whether the shopping information 810 is for the content being displayed by the display 180.

The output time point of the notification may include at least one of a time point at which a channel switch command is received, a time point when a content change is detected, a time point at which a banner output command is received, and a time point at which an EPG output command is received. However, this is only an example, and the controller 170 may detect another time pint as an output time point of the notification even through it does not correspond to the time point described above. Hereinafter, it is assumed that the time point at which a channel switch command is received, the time point when a content change is detected, the time point at which a banner output command is received, and the time point at which an EPG output command is received are provided as the output time point of the notification for whether the shopping information 180 is available. Accordingly, the controller 170 may include the time point at which a channel switch command is received, the time point when a content change is detected, the time point at which a banner output command is received, or the time point at which an EPG output command is received.

Specifically, the controller 170 may acquire whether a channel switch command is received (S10). When the controller 170 does not receive the channel switch command, the controller 170 may acquire whether a content change is detected (S20). When the content change is not detected, the controller 170 may acquire whether the banner output command is received (S30). When the banner output command is not received, the controller 170 may acquire whether the EPG output command is received (S40). When the EPG output command is not received, the controller 170 may again acquire whether the channel switch command is received.

In this case, the order of step S10, step S20, step S30, and step S40 may be changed.

In step S10, when receiving the channel switch command, the controller 170 may count a duration time for channel switching (S11).

When receiving the channel switch command, the controller 170 may control the display 180 to display the shopping icon 50.

According to an embodiment, when receiving the channel switch command, the controller 170 may switch a channel of an image to be displayed by the display 180 according to the channel switch command, and count a duration time for the switched channel.

The reason for this is that it is unnecessary to determine whether or not content includes shopping information as soon as the channel has been switched since there is a relatively high possibility that switch to another channel occurs after the channel has been switched. That is, in the case of simple channel zapping, the duration time of the channel switching may be counted not to perform the operation of determining whether the content includes shopping information.

That is, when a predetermined time has elapsed after the channel is switched according to the channel switch command, the controller 170 may count a time during which the user continues to watch content of the switched channel so as to acquire content information and a playback time point.

Meanwhile, according to another embodiment, when receiving the channel switch command, the controller 170 may switch a channel and immediately acquire content information and a playback time point when the channel is switched.

The controller 170 may acquire whether the duration time for the channel switching has elapsed than a set time (S13).

For example, the set time may be 5 minutes, but this is only exemplary.

When the duration time for the channel switching have not elapsed than the set time, the controller 170 may continuously count the duration time for the channel switching.

When the controller 170 receives the channel switch command again before the duration time for channel switching has elapsed, the controller 170 may initialize the duration time and count a duration time for the re-switched channel.

On the other hand, when the duration time for the channel switching has elapsed than the set time, the controller 170 may acquire content information and a playback time point (S15).

When the duration time for the channel switching has elapsed than the set time, the controller 170 may acquire content information and a playback time point in order to determine whether shopping information is included in content according to a switched channel.

That is, in order to acquire whether the content being currently displayed on the display 180 includes shopping information, the controller 170 may acquire content information and a playback time point.

Next, a method of acquiring content information and a playback time in a display device according to an embodiment of the present disclosure will be described with reference to FIG. 7.

Figure 7:
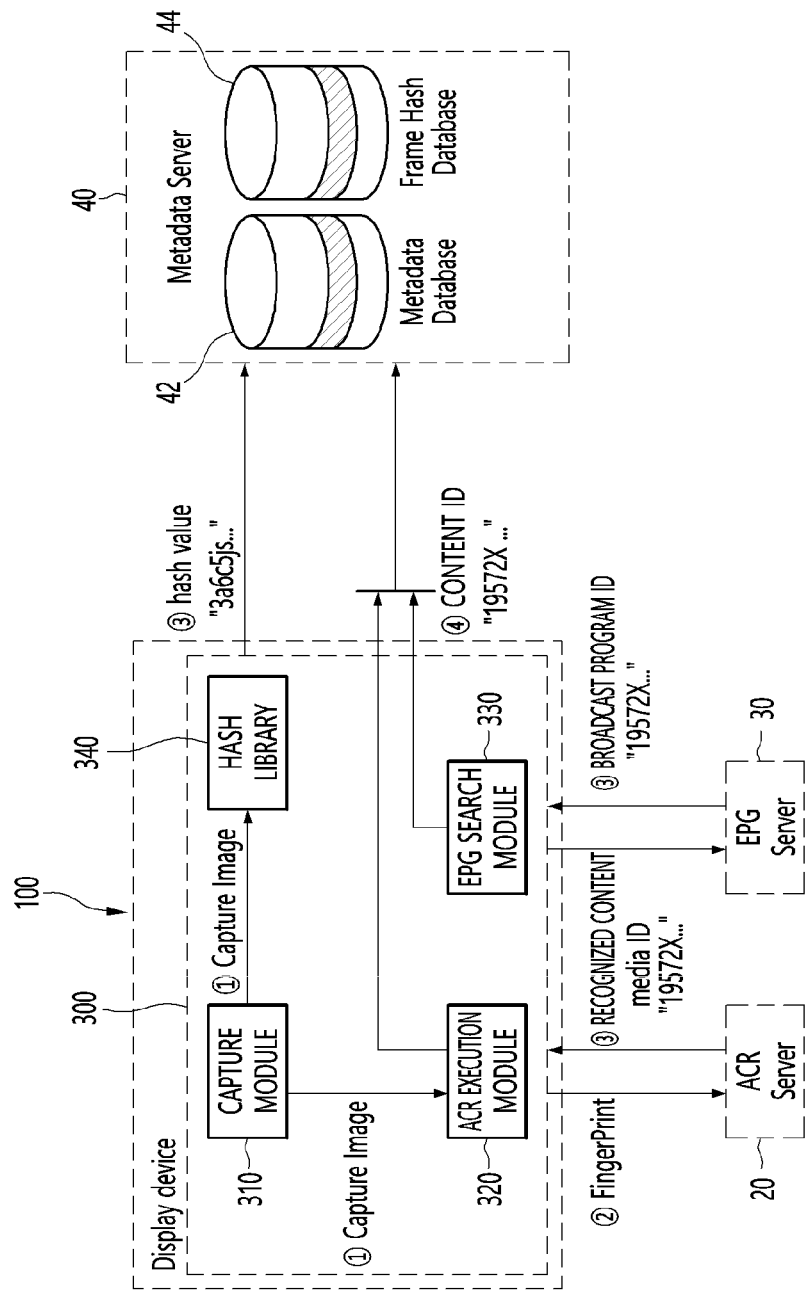
FIG. 7 is a block diagram for describing a method of recognizing content which a user is watching and acquiring a playback time point in a display device according to an embodiment of the present disclosure.

FIG. 7 is a block diagram for describing a method of recognizing content which a user is watching and acquiring a playback time point in a display device according to an embodiment of the present disclosure.

The display device 100 may acquire information on content being viewed by the user and a playback time point through external servers 20, 30, and 40. Specifically, the display device 100 may transmit data for a capture image of the content to the external server 20, 30, and 40, and acquire the content information and the playback time by receiving response data for the data on the capture image from the external server 20, 30, and 40.

In this case, the external servers 20, 30, and 40 may include at least one of an ACR server 20, an EPG server 30, and a metadata server 40. The data for the capture image may include an identification value, a hash value, a content ID, a program ID, and the like.

The display device 100 may include a content search module 300, and the content search module 300 may be a component of the controller 170.

The content search module 300 may include at least one of a capture module 310, an ACR execution module 320, an EPG search module 330, and a hash library 340.

The capture module 310 may capture a scene of content currently being displayed on the display 180. The capture module 310 may acquire a capture image of the content.

The capture module 310 may transfer the capture image to the ACR execution module 320 and the hash library 340.

The ACR execution module 320 may recognize the content being displayed by the display 180 through the capture image. That is, the ACR execution module 320 may obtain information on the content displayed through the display 180. The ACR execution module 320 may recognize content information in a screen currently being viewed by the user in real time in a fingerprint method. The ACR execution module 320 may acquire an ID of the content.

The ACR execution module 320 may receive the capture image from the capture module 310 and acquire an identification value from the capture image which is inputted. The ACR execution module 320 may transmit the identification value to the ACR server 20 and acquire an ID (e.g., 19572X) of the content responding to the identification value from the ACR server 20. The ACR server 20 may acquire content information through the ID of the content.

The ACR execution module 320 may acquire the ID of the content regardless of a type of the content.

According to an embodiment, the ACR execution module 320 may acquire a playback time point as well as the ID of the content.

Meanwhile, the EPG search module 330 may acquire content information. The EPG search module 330 may recognize the content currently being viewed by the user through broadcast information for each time zone. The EPG search module 330 may recognize the content being displayed by the display 180 by extracting a program corresponding to the current time from the EPG.

The EPG search module 330 may transmit a content information request signal to the EPG server 30 and receive a program ID (e.g., 19572X) or a program name corresponding to the content information request signal from the EPG server 30. The EPG search module 330 may acquire content information through the program ID.

The EPG server 30 may also transmit a playback time point of the content to the EGP search module 330 by calculating the playback time point based on the start time and the current time of the program on the EPG.

When a broadcast image is input, the EPG search module 330 may acquire at least one of content information and a playback time point.

On the other hand, the hash library 340 may acquire a playback time point of the content. The ACR execution module 320 or the EPG search module 330 may also acquire the playback time point but when the hash library 340 uses a hash value of a capture image, acquire the playback time point more accurately.

Specifically, the hash library 340 may receive the capture image from the capture module 310 and calculate a hash value of the received capture image. The hash library 340 may transmit the calculated hash value to the metadata server 40, and the metadata server 40 may acquire the playback time point of the content corresponding to the hash value by using the data stored in the hash database 44.

In addition, the metadata server 40 may receive content information from at least one of the ACR execution module 320 or the EPG search module 330 and in this case, the metadata server 40 may acquire a playback time point by searching for a hash value in a content range according to the received content information from the data stored in the hash database 44. That is, the display device 100 may acquire content information using at least one of ACR or EPG, and then acquire a playback time point by using a hash value of the capture image, and in this case, a search range for the hash value for acquiring a playback time point is reduced, thus minimizing a time required to acquire the content playback time point.

Meanwhile, the metadata server 40 may acquire shopping information from the metadata database 42 based on the content information and the content playback time point. That is, after acquiring the content information and the content playback time point, the metadata server 40 may extract shopping information corresponding to the content information and the content playback time point from the metadata database 42 and transmit the shopping information to the display device 100.

The controller 170 of the display device 100 may acquire the shopping information corresponding to information on the content being displayed on the display 180 and the playback time point from the metadata server 40.

As described above, when the controller 170 uses at least two of the ACR, the EPG, and the hash library, there is an advantage in that it is possible to reduce a time required for searching for information on the content and the playback time point and increase search accuracy. In addition, since the controller 170 is capable of acquiring whether or not shopping information is included in the content, the controller 170 may determine whether to display a shopping icon.

Again, details will be described with reference to FIG. 6.

When there is shopping information related to the content, the controller 170 may display a shopping icon (S17).

The controller 170 may control the display 180 to display the shopping icon 50 when there is the shopping information related to the content as a result of acquisition of the content information and the playback time point.

When there is the shopping information related to the content, the controller 170 may control the display 180 to display the shopping icon on the content.

On the other hand, when there is no shopping information related to the content, the controller 170 may not display the shopping icon. When there is no shopping information related to the content, the controller 170 may display only the content.

In addition, when there is no shopping information, the controller 170 may re-capture the content displayed on the display 180 to acquire whether or not the shopping information is included in the content after a predetermined time has elapsed. That is, the controller 170 may re-acquire a capture image of the content and re-acquire shopping information using data for the re-acquired capture image after a set time has elapsed when there is no shopping information related to the content.

The controller 170 may determine whether a command for selecting a shopping icon has been received (S19).

When the controller 170 does not receive a command to select a shopping icon, the controller 170 may acquire content information and a playback time again.

In this case, when a command for selecting a shopping icon is not received, the controller 170 may acquire content information and a playback time point after a predetermined time has elapsed. The reason for this is that shopping information may be changed because a scene of the content is switched after a predetermined time has elapsed without the shopping icon being selected.

When receiving the command for selecting the shopping icon, the controller 170 may display the shopping information (S21).

Since the method of displaying shopping information is the same as that described with reference to FIG. 5, a redundant description will be omitted.

FIG. 8 is a diagram showing a method of displaying a shopping icon when a channel switch command is received in a display device according to an embodiment of the present disclosure.

The channel switch command may include a channel up/down button input command, a channel number input command, a channel selection command within an EPG app, a channel switch command through voice recognition, and the like.

Referring to the example of FIG. 8, the controller 170 may receive a channel switch command to the 20th channel while the content of the 10th channel is being displayed. When the channel switch command is received, the controller 170 may change content displayed by the display 180 from an image of the 10th channel to an image of the 20th channel. In addition, when a duration time of the channel 20 has elapsed, the controller 170 may capture content of the 20th channel, perform a hash operation dhash on the capture image, and transmit the capture image to the metadata server 40. The controller 170 may acquire whether content of the 20-th channel includes shopping information through the metadata server 40.

When it is determined that content of a switched channel includes shopping information, the controller 170 may display the shopping icon 50 on the content, as illustrated in FIG. 8.

In this way, when receiving the channel switch command, the controller 170 may acquire whether shopping information is included in the content according to the switched channel, and display the shopping icon 50.

Meanwhile, the controller 170 may determine whether to display the shopping icon 50 by detecting that the content is changed within the same channel. That is, the controller 170 may detect whether the content is changed, and control the display 180 to display a shopping icon when the content is changed.

Referring to FIG. 6 again, the controller 170 may detect a content change in step S20. When the controller 170 detects that the content has been changed, the controller 170 may acquire the content information and the playback time point, and display a shopping icon when there is shopping information related to the content based on the content information and the playback time point. That is, when the controller 170 detects a change in content in step S20, the controller 170 may perform steps S15, S17, S19, and S21, which are the same as described above, and thus, a duplicate description will be omitted.

FIG. 9 is an exemplary diagram of a method of displaying a shopping icon when a content change is detected in a display device according to an embodiment of the present disclosure.

The controller 170 may detect whether the content is changed in a state in which the channel is not switched.

According to an embodiment, the controller 170 may acquire an end time point of the current content from the EPG. The controller 170 may acquire a time point at which a change to another content occurs based on the acquired end time point of the content. The controller 170 may acquire a time point obtained by adding an expected advertisement time to the end time point of the content acquired from the EPG as a start time point of another content.

The controller 170 may acquire one of the start time point of another content or a time point after the start time point of another content as the time point at which the change to another content occurs. When the controller 170 detects the time point at which the change to another content occurs, the controller 170 may detect that the content being displayed by the display 180 has been changed.

According to another embodiment, the controller 170 may detect whether the content is changed through the ACR execution module 320.

When the controller 170 detects that the switch to another content has occurred, the display 180 may capture the content being displayed again, perform operation dhash on the capture image and transmit the capture image to the metadata server 40. The controller 170 may acquire whether the another content to which the change has occurred includes shopping information through the metadata server 40.

When it is determined that content of another channel includes shopping information, the controller 170 may display the shopping icon 50 on the content, as illustrated in FIG. 9.

As described above, by detecting whether the change to another content has occurred, the controller 170 may acquire whether or not the content includes shopping information, and display the shopping icon 50.

Meanwhile, when receiving the banner output command, the controller 170 may recognize that the user currently wants to know whether the content includes the shopping information, and determine whether to display the shopping icon 50.

Referring to FIG. 6 again, the controller 170 may determine whether the banner output command is received in step S30.

The banner output command may be a case where an input of the confirmation button 238 provided in the remote control device 200 is received. However, it is merely exemplary. The banner output command may be received even when the channel is switched.

When the banner output command is received, the controller 170 may acquire the content information and the playback time point, and display a shopping icon when there is shopping information related to the content based on the content information and the playback time point. That is, when the controller 170 detects a change in content in step S30, the controller 170 may perform steps S15, S17, S19, and S21, which are the same as described above, and thus, a duplicate description will be omitted.

Figure 10:
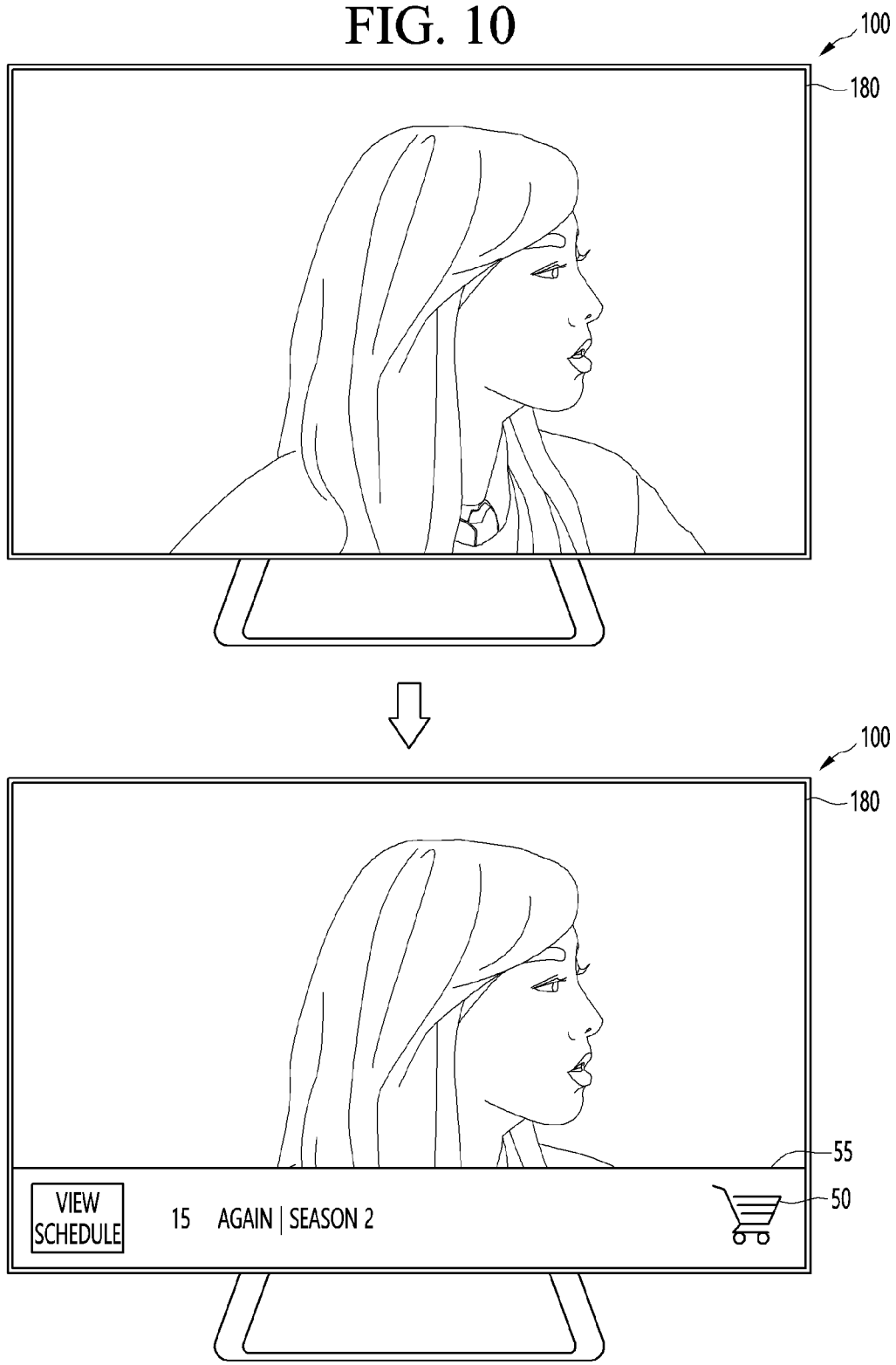
FIG. 10 is a diagram showing a method of displaying a shopping icon when a banner output command is received in a display device according to an embodiment of the present disclosure.

FIG. 10 is a diagram showing a method of displaying a shopping icon when a banner output command is received in a display device according to an embodiment of the present disclosure.

The controller 170 may acquire whether a banner output command is received. As illustrated in FIG. 10, the controller 170 may display a banner 55 when receiving a banner output command. The controller 170 may output the banner 55 and simultaneously acquire an image obtained by capturing a screen of the display 180. The controller 170 may perform operation dhash on the capture image and transmit the capture image to the metadata server 40. The controller 170 may acquire whether the content being displayed along with the banner 55 includes shopping information through the metadata server 40.

When it is determined that the content being displayed along with the banner 55 includes shopping information, the controller 170 may display the shopping icon 50 on the content, as illustrated in FIG. 9. The controller 170 may display the shopping icon 50 on the banner 55.

As described above, by detecting whether the banner output command is received, the controller 170 may acquire whether or not the content includes shopping information, and display the shopping icon 50.

Meanwhile, when receiving an EPG output command, the controller 170 may display the shopping icon 50 on the EPG.

Referring to FIG. 6 again, when receiving the EPG output command in step S40, the controller 170 may acquire a program having shopping information among program s in the EPG (S23), and display a shopping icon 50 in a program item having shopping information (S25).

The EPG output command may be received through a broadcast guide entry command, a program list check command, a current channel list entry command, or the like.

When receiving the EPG output command, the controller 170 may request EPG data from the EPG server 30 and receive the EPG data from the EPG server 30. In particular, the controller 170 may request a content list from the EPG server 30 and receive the content list from the EPG server 30.

When pieces of duplicated content exists in the EPG, the EPG server 30 may integrate the pieces of duplicated content into one and transmit a minimized content list to the display device 100.

The controller 170 may acquire whether each content included in the content list includes shopping information based on the EPG data. The controller 170 may transmit information on each content included in the content list to the metadata server 40 and receive from the metadata server 40 whether or not each content includes shopping information. Through this, the controller 170 may acquire only a program having shopping information among programs in the EPG.

When displaying the EPG, the controller 170 may display the shopping icon 50 only on a program having shopping information among programs included in the EPG.

Figure 11A:
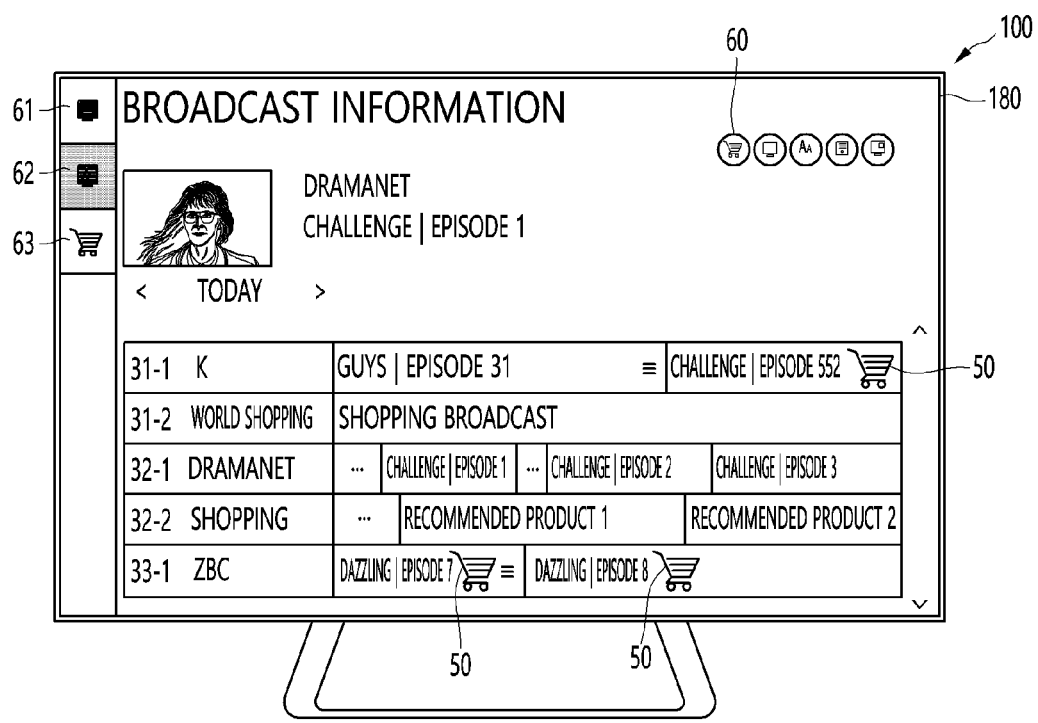
FIG. 11A is a diagram showing a method of displaying a shopping icon on EPG when a broadcast guide entry command is received in a display device according to an embodiment of the present disclosure.

FIG. 11A is a diagram showing a method of displaying a shopping icon on EPG when a broadcast guide entry command is received in a display device according to an embodiment of the present disclosure.

As the display 180 receives the broadcast guide entry command, as shown in FIG. 11A, the display 180 may display an EPG for broadcast guide.

The EPG for broadcast guide may include program names and time information of programs currently being broadcast and programs scheduled to be broadcast for each channel. That is, the EPG may include a plurality of program items, each of the plurality of program items includes a program name, and each of the plurality of program items may be disposed at a location corresponding to a corresponding channel and time.

The controller 170 may extract a program including shopping information from among programs included in the EPG. Specifically, by transmitting each of the programs included in the EPG to the metadata server 40, the controller 170 may acquire from the metadata server 40 whether each of the programs included in the EPG includes shopping information.

The controller 170 may control the display 180 to display the shopping icon 50 only in a program in which shopping information exists among programs included in the EPG.

The EPG may include at least one of a channel list icon 61, a broadcast guide icon 62, and shopping program icons 60 and 63.

The channel list icon 61 may be an icon for displaying an EPG representing a program currently being broadcast for each channel. The EPG representing programs for each channel will be described in detail with reference to FIG. 11B.

The broadcast guide icon 62 may be an icon for displaying an EPG representing current and future broadcast programs. The EPG may be EPG shown in FIG. 11A.

The shopping program icons 60 and 63 may be icons for displaying a shoppable content list, which is an EPG representing only programs having shopping information. Details will be described with reference to FIG. 12.

Figure 11B:
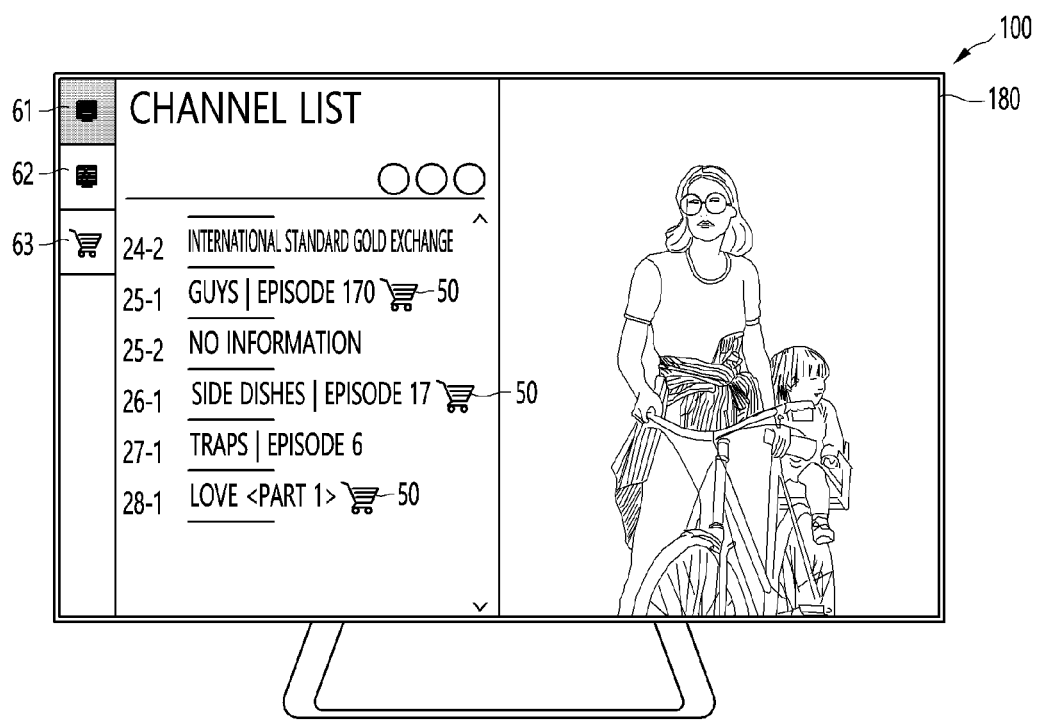
FIG. 11B is a diagram showing a method of displaying a shopping icon on EPG when a channel list entry command is received in a display device according to an embodiment of the present disclosure.

FIG. 11B is a diagram showing a method of displaying a shopping icon on EPG when a channel list entry command is received in a display device according to an embodiment of the present disclosure.

As the display 180 receives the channel list entry command, as illustrated in FIG. 11B, the display 180 may display an EPG representing a program currently being broadcast for each channel.

The EPG representing the program currently being broadcast for each channel may include a program currently being broadcast for each channel. That is, the EPG may include a plurality of program items, and each of the plurality of program items may include a program currently being broadcast on a channel.

As shown in FIGS. 11A and 11B, the controller 170 may control the display 180 to display the shopping icon 50 only in a program in which shopping information exists among programs included in the EPG.

Figure 12:
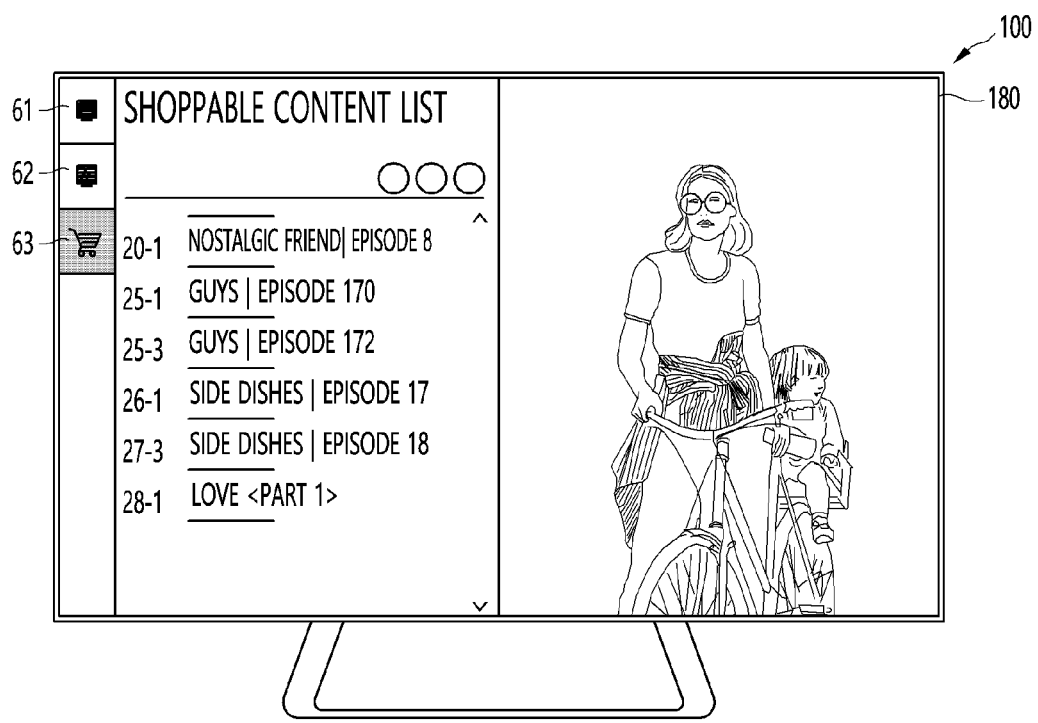
FIG. 12 is an exemplary diagram of a method for displaying a list of shoppable content according to an embodiment of the present disclosure.

FIG. 12 is an exemplary diagram of a method for displaying a shoppable content list according to an embodiment of the present disclosure.

The controller 170 may receive a command to display the shoppable content list. For example, the controller 170 may display the shoppable content list when receiving a command for selecting the shopping program icons 60 and 63. However, this is only exemplary, and the controller 170 may receive the command to display the shoppable content list through various methods.

The shoppable content list may be a list consisting programs in which shopping information exists.

When the controller 170 receives the command to display the shoppable content list, as illustrated in FIG. 12, the controller 170 may control the display 180 to display the shoppable content list.

The shoppable content list may include program items having shopping information. Each of the items included in the shoppable content list may be a program having shopping information.

In particular, the shoppable content list may be a list obtained by extracting only programs having shopping information among programs included in the EPG, which are programs currently being broadcast or scheduled to be broadcast.

The controller 170 may perform a viewing switch of a program corresponding to each item or a shopping reservation through a command for selecting at least one item included in the list shown in FIGS. 11A, 11B, and 12.

Figure 13:
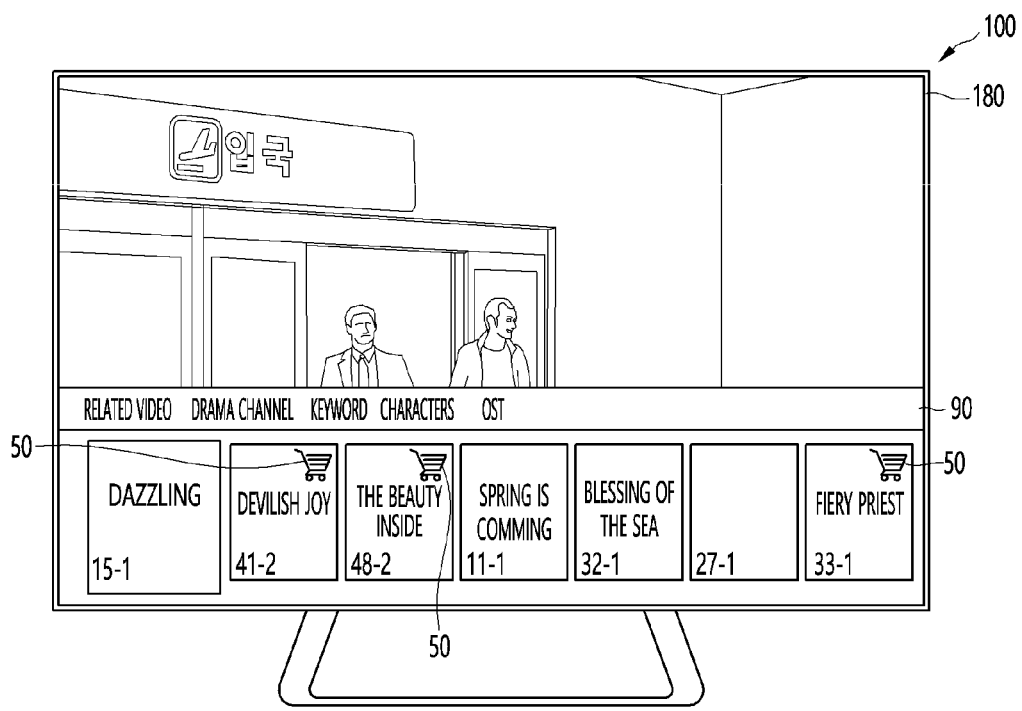
FIG. 13 is an exemplary diagram of a method for displaying a shopping icon on a related search screen in a display device according to an embodiment of the present disclosure.

FIG. 13 is an exemplary diagram of a method for displaying a shopping icon on a related search screen in a display device according to an embodiment of the present disclosure.

The controller 170 may control the display 180 to display related search information 90. The related search information 90 may include content associated with content currently being displayed by the display 180. When receiving the related search command, the controller 170 may control the display 180 to display a result of the search for content related to the content currently being displayed by the display 180 as the related search information 90.

In this case, the controller 170 may extract a content having shopping information from among pieces of content included in the related search information 90. The controller 170 may control the display 180 to display a shopping icon 50 on the content having shopping information among the pieces of content included in the related search information 90.

As shown in FIGS. 11 to 14, the display device 100 displays the shopping icon 50 on a program item or a content item, making it easy to guide the user for a program or content in which shopping information exists.

Figure 14:
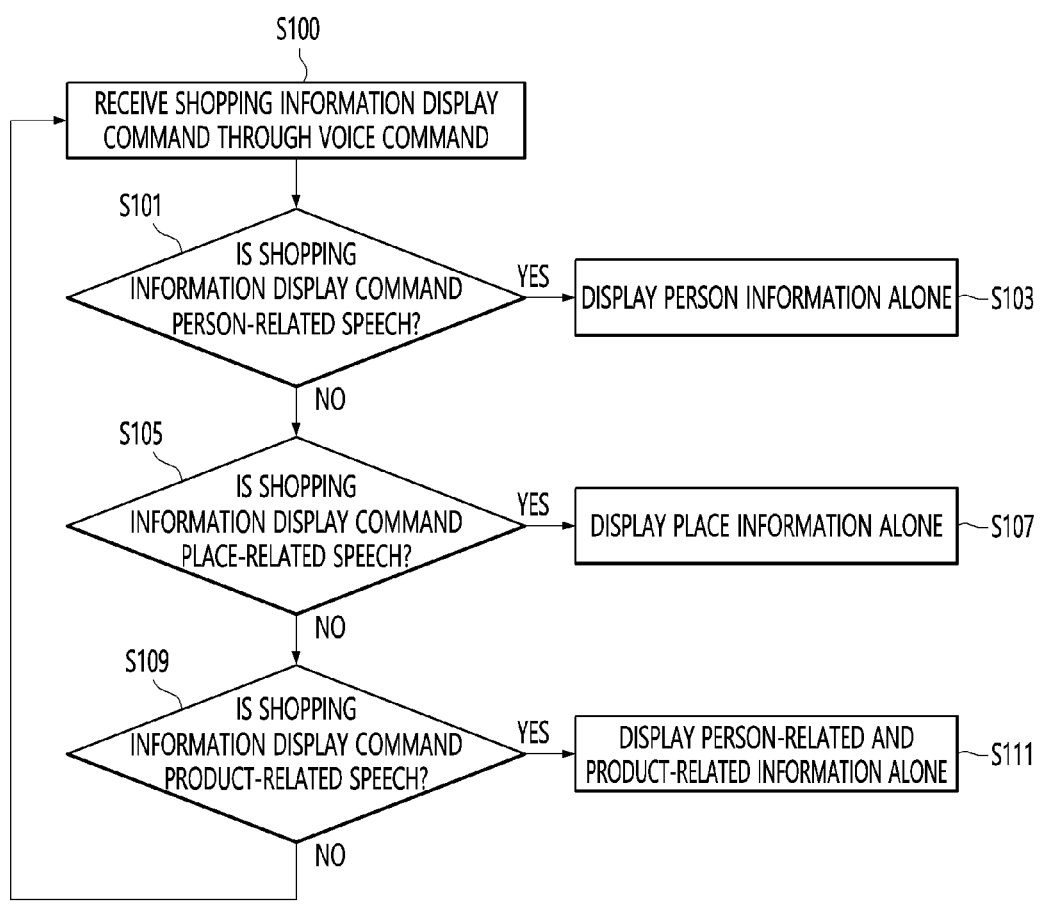
FIG. 14 is a flowchart showing a method of displaying shopping information through voice speech in a display device according to another embodiment of the present disclosure.

FIG. 14 is a flowchart showing a method of displaying shopping information through voice speech in a display device according to another embodiment of the present disclosure.

The controller 170 may receive a shopping information display command through a voice command (S100).

For example, the shopping information display command through a voice command may include "Give me shopping information", "Who is that person?", "Where is that place?", "What is that product?" and the like, but they are only exemplary. The controller 170 may recognize the voice command as described above through the voice acquisition module 175 and determine whether the shopping information display command is received by analyzing the recognized voice command.

The controller 170 may determine whether the shopping information display command is a person-related speech (S101).

For example, a command to display person-related shopping information may be "Who is that person (woman/male)?", "Tell me who appeared", and the like.

When the shopping information display command is a person-related speech, the controller 170 may display person information alone (S103).

The controller 170 may control the display 180 to display shopping information obtained by extracting only person information. For example, the controller 170 may control the display to display only the capture image 820 and the person information 830 among the shopping information shown in FIG. 5. As another example, the controller 170 may control the display to display the person information 830 alone among the shopping information shown in FIG. 5.

When the shopping information display command is not a person-related speech, the controller 170 may determine whether the shopping information display command is a place-related speech (S105).

For example, the command to display place-related shopping information may be "where is that place?", "where is the background here?", "tell me that place", and so on.

The controller 170 may display place information alone when the shopping information display command is the place-related speech (S107).

The controller 170 may control the display 180 to display shopping information obtained by extracting only place information. For example, the controller 170 may control the display 180 to display only the capture image 820 and the place information 860 among the shopping information shown in FIG. 5. As another example, the controller 170 may control the display to display only the place information 860 among the shopping information shown in FIG. 5.

When the shopping information display command is not a place-related speech, the controller 170 may determine whether a shopping information display command is a product-related speech (S109).

For example, the command to display product-related shopping information may be "What is that person wearing?", "What is that {product category}?", "Tell me product information", and so on.

The controller 170 may display only person and product information when the shopping information display command is the product-related speech (S111).

The controller 170 may control the display 180 to display shopping information obtained by extracting only person and product information. For example, the controller 170 may control the display 180 to display only the capture image 820, the person information 830, and the product information 840 among the shopping information shown in FIG. 5. As another example, the controller 170 may control the display to display only the person information 830 and the product information 840 among the shopping information shown in FIG. 5.

Meanwhile, although it is illustrated in FIG. 13 to determine whether the shopping information display command is a person-related, place-related, or product-related speech is shown, the controller 170 may determine whether or not the shopping information display command is a music-related speech, and when it is the music-related speech, display only music information.

In addition, when the shopping information display command does not correspond to a person-related, place-related, product-related, or music-related speech, the controller 170 may display shopping information as illustrated in FIG. 5.

In addition, as another example, the controller 170 may receive a content shopping information display command for displaying all shopping information related to a content currently being viewed. For example, the display 180 may display all shopping information display icons (not shown), and when receiving a command for selecting all the shopping information display icons (not shown), the display 180 may display all shopping information related to content being displayed. That is, according to all the shopping information display icons (not shown), the controller 170 may control the display 180 to display all shopping information related to the content regardless of a current scene of the content.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
a display configured to display content; and
a controller configured to:
capture an image of the displayed content,
transmit data of the captured image to a hash library and at least one of an Automatic Content Recognition (ACR) server and Electronic Program Guide (EPG) server,
receive content information of the content corresponding to the captured image from the at least one of the EPG server and the ACR server,
calculate a hash value of the captured image from the hash library for determining a playback time point of the content,
transmit the received content information and the hash value for determining the playback time point of the content to a metadata server,
receive content information and the playback time point of the content from the metadata server,
acquire a presence or absence of shopping information related to the displayed content based on the received content information and the playback time point of the content,
acquire a shopping information related to the content information according to the acquired presence of the shopping information, and
display the shopping information on the display.

2. The display device of claim 1, wherein the playback time point of the content is determined by searching for the calculated hash value in the hash database of the metadata server.

3. The display device of claim 1, wherein the playback time point of the content is determined by searching for the calculated hash value in a content range defined by the content information from the at least one of the ACR server and the EPG server.

4. The display device of claim 3, wherein a search range for acquiring the playback time point is reduced using the hash value and the content range of the content information from the at least one of the ACR server and the EPG server.

5. The display device of claim 4, wherein the content information comprises at least one of an identification value, a hash value, a content ID and a program ID.

6. The display device of claim 1, wherein the controller is further configured to:
display a shopping icon on the display indicating the shopping information is present for the displayed content.

7. The display device of claim 6, wherein the controller is further configured to:
in response to the shopping information being absent, capture an additional image of the displayed content and re-acquire shopping information using data for the captured additional capture image after a set time has elapsed from the shopping information being absent.

8. The display device of claim 6, wherein the controller is further configured to:
display a banner on the display, and
displayed the shopping icon on the displayed banner.

9. The display device of claim 8, wherein the controller is further configured to display the captured image on the banner.

10. The display device claim 6, wherein the controller is further configured to display the shopping icon when a channel switch command is received.

11. The display device of claim 10, wherein the controller is further configured to acquire the content information and the playback time point when a set time has elapsed after a channel has been switched according to the channel switch command.

12. The display device of claim 11, wherein the controller is further configured to display the shopping icon when there is the presence of the shopping information related to the content as a result of the acquisition of the content information and the playback time point.

13. The display device of claim 6, wherein the controller is further configured to:
detect whether the content is changed, and
display the shopping icon when the content is changed.

14. The display device of claim 6, wherein the controller is further configured to display the shopping icon when an EPG is displayed on the display.

15. The display device of claim 6, wherein the controller is further configured to display the shopping icon with respect to a program of which shopping information is present among programs included in the EPG.

16. The display device of claim 1, wherein the shopping information comprises at least one of the capture image, product information, and non-product information.

17. The display device of claim 16, wherein the non-product information comprises at least one of person information, music information, and place information.

18. The display device of claim 1, wherein the controller is further configured to:
capture an additional image of the displayed content and re-acquire shopping information using data for the captured additional image after a set time has elapsed in response to the acquired absence of the shopping information from the metadata server.

19. The display device of claim 1, wherein the controller is further configured to:
   receive a shopping information display command through a voice command.

* * * * *